3,288,872
ALKALI METAL POLYMERIZATION OF
CONJUGATED DIENES
William Thomas House, Baton Rouge, La., assignor to
Esso Research and Engineering Company, a corporation of Delaware
No Drawing. Filed May 14, 1963, Ser. No. 280,451
2 Claims. (Cl. 260—669)

This invention relates to method for preparing polymers and copolymers of a conjugated diene such as 1,3-butadiene. In one preferred embodiment the invention relates to the use of a specific catalyst activator in the alkali metal polymerization of butadiene 1,3 to produce a low molecular weight product of controlled viscosity in a relatively short time.

Valuable unsaturated polymers, including drying oils of excellent quality can be made by polymerizing about 50 to 100 parts of a conjugated diene of four to six carbon atoms such as butadiene 1,3, hexadiene, isoprene, 2,3-dimethyl butadiene, 1,3-piperylene and methyl pentadiene and about 50 to 0 parts of vinyl aromatic hydrocarbon such as styrene, paramethyl styrene, and dimethyl styrene at 25 to 95° C., preferably at 45 to 85° C., in the presence of finely divided alkali metal as the catalyst and of about 50 to 500 parts of an inert hydrocarbon diluent boiling between about 0 to 250° C., or preferably between 30 and 200° C., such as pentane, benzene, cyclo-hexane, naphtha, mineral spirits, or olefins. Where low boiling materials are used, it is desirable to operate under sufficient pressure to maintain the charge in liquid phase, e.g., under pressures ranging from 1 to 5 atmospheres. Certain promoting agents, e.g., about 1 to 100 parts of dioxane or diethyl ether and catalyst activators, e.g., 1 to 20 percent of isopropyl alcohol based on the weight of alkali metal have also been added to the reaction mixture to assure the production of a colorless oil and to shorten the reaction time.

It has now been found that the reaction time for the polymerization can be materially shortened by substituting 1 to 26 wt. percent of hexamethyl phosphoramide based on the weight of the alkali metal for the isopropyl alcohol activator.

According to the invention, 50 to 100 parts of a conjugated diolefin of 4 to 6 carbon atoms, such as butadiene and 50 to 0 part of a vinyl aromatic hydrocarbon such as styrene, etc., are copolymerized in a multistage once-through continuous process in the presence of finely divided alkali metal catalyst, such as lithium, sodium, potassium, caesium and rubidium. The temperatures will vary from stage to stage. The first stage is suitably carried out at a temperature between 40 and 95° C. while the second stage and succeeding stages may be as high as 105° C. It is often desirable to carry out the second and succeeding stages at considerably higher temperatures than those used in the first stage. Suitable temperatures for the first stage then would be between 45 and 75° C. while those for the second and later stages would be between 55 and 105° C. The operation is carried out within these temperature ranges in such a manner that the temperature of any given stage is about equal to or higher than the immediately preceding stage. As a polymerization catalyst about 0.6 to 8 parts of finely divided alkali metal per 100 parts of monomers is used, preferably about 1 to 5 parts. The number of stages will depend on the reactivity of the polymerization system. If the desired degree of conversion is not obtained in two stages, one or more stages may be added.

Materials used as diluents in the polymerization should be liquid at the polymerization temperature, that is, they should boil between 20 and 250° C., although more volatile materials boiling as low as −15° C. may also be used, providing that the polymerization pressure is increased correspondingly. Preferred diluents are essentially aliphatic hydrocarbons such as naphtha (boiling range about 90 to 120° C.) or straight run mineral spirits such as Varsol (boiling range about 150 to 200° C.), but butane, pentane, benzene, toluene, xylene, cyclohexane, butenes, pentenes or similar inert hydrocarbons are also usable, individually or in admixture with each other. In general, the aromatic solvents are not so desirable as the aliphatic ones because of the toxicity of the former. The hydrocarbon diluents are used in amounts ranging from 50 to 500 parts by weight per 100 parts of monomers.

An important feature of the process involves the use of a substantial amount of certain ethers as co-diluents or modifiers along with the hydrocarbon diluent described above. A particularly outstanding promoter for the batch process has been found in dioxane-1,4 whose presence in the feed aids in the production of a colorless product of desirable viscosity and good drying properties, and promotes the reaction sufficiently to give 100% conversion at 50° C., in a period of about 5 to 10 hours. Similarly favorable results were also obtained with the diethyl ether or ethylene glycol, $H_5C_2OCH_2CH_2OC_2H_5$ with diethyl ether $(C_2H_5)_2O$, and also with the diethyl ether of diethylene glycol, $H_5C_2O(CH_2)_2.O.(CH_2)_2OC_2H_5$. In the batch process, diethyl ether is usable, although the initial induction period tends at times to be somewhat long. The diethyl ether of ethylene glycol is not preferred, because with it a product having an undesirably high molecular weight is produced. However, diethyl ether is the preferred ether in a continuous process as the difficulty in starting up the reaction occurs only at the beginning of the polymerization which runs for a long period of time in contrast to batching runs which have to be started up frequently. Diethyl ether is less subject to undesirable side reactions with alkali metal, and it is a more vigorous promoter than dioxane. However, dioxane is usable also, but not preferred. Other ethers useful to a still lesser extent are diethyl acetal, vinyl isobutyl ether, dihydropyrane and ethylal, all of which have a favorable effect on improving the color of the product.

In contrast to the preferred ethers named earlier herein, the four ethers just named have a moderate retarding effect on the polymerization rate. Finally, all cyclic ethers having an O—C—O— group in a ring structure, such as dioxane, 1,3,dioxolane, paraldehyde and glycol ethylidene diacetal, inhibit the polymerization rate so excessively that their use is impractical. Dimethyl ether also does not serve the desired purpose, both as regards reaction rate and product quality. Thus the cyclic ethers must have the oxygen atoms separated by at least two carbon atoms.

The ether promoter is used in amounts ranging from about 1 to 100 parts, preferably 1 to 50 parts by weight per 100 parts of monomers. In selecting the ether co-diluent it is especially desirable in many cases to select an ether having a boiling point of at least 10° C., below the lower limit of the boiling range of the hydrocarbon diluent, and thus, when using a mineral spirits having a boiling range of 150° C. to 200 C. ether co-diluents boiling between about 25 and 140° C. are preferred for the reason that their separation from the hydrocarbon diluent in the polymerized reaction mixture is greatly facilitated by virtue of the stated difference in boiling points. If the polymer is recovered in above 100% purity, the ether may conventionally boil in the range of the hydrocarbon diluent since both may be recycled together in making up the fresh feed to the reactor.

In accordance with this invention 1 to 26 wt. percent based on Na of hexamethyl phosphoramide are used in the polymerization recipe in order to reduce the reaction time and increase the 1,2 addition in the polymerization mechanism.

The reaction time and induction period vary depending on the degree of catalyst dispersion, reaction temperature, purity of feed materials and sequence of monomer addition.

The residence time per reactor stage is about 0.5 to 6 hours, depending on the reaction conditions. It is preferred to operate with a catalyst particle size of about 1 to 50, or 10 to 50 microns, such as a mixture ranging from 20 to 40 microns. Such a catalyst can be prepared by dispersing the molten alkali metal in a hydrocarbon such as Varsol by means of a homogenizer such as an Eppenbach-Homo-Mixer and cooling the resulting dispersion below the melting point of the metal to prevent coalescene of the dispersed particles.

The catalyst is usually fed to the reactor as a slurry of metal particles dispersed in 2 to 200 parts by weight of a hydrocarbon liquid, which may or may not be the same as the reaction diluent. Agitation of the reaction mixture during synthesis increases the efficiency of the catalyst.

It is preferable to initiate the continuous process by first charging the first stage of the reactor and batch reacting the charge until the reaction has reached a conversion level of at least 40 to 60% but which may reach 80%, and then beginning the continuous addition of reactant, solvent, modifiers and catalyst. The reactor contents flow continuously to the second vessel and styrene, solvent, modifier, and catalyst added as desired. The reaction continues in this vessel or stage from which the contents continuoulsy flow to succeeding stages if desired. The greater the number of stages the closer the operation approaches a batch operation. From three to five stages is usually satisfactory.

Destruction of catalyst at the end of the reaction is effectively accomplished by adding to the reaction mixture a moderate excess of an anhydrous $C_1$ to $C_5$ fatty acid which is soluable in the hydrocarbon mixture, e.g., formic, acetic or pentanoic, or with sulfuric acid as described in application, Serial No. 396,324, filed December 4, 1953, now U.S. Patent No. 2,712,561. After destruction of the catalyst the crude polymerization product containing the salts, excess acid and other impurities is neutralized with ammonia, and the neutralized product is finally filtered preferably with a filter aid such as silica gel, clay, charcoal or its equivalent. Separation can also be accomplished by centrifuging, if desired. Other ways of destroying the catalyst may be used, such as by adding alcohol, or inorganic acids, or by treating with clay or washing with water.

Since the resulting polymer solution is usually too dilute for most practical use as a varnish or enamel base, it is advantageous to distill off some of the volatile hydrocarbon solvent until a product containing not less than 40% to 70% non-volatile matter is obtained, the non-volatile matter being the polymeric drying oil. Where even more highly concentrated products are desired it is possible to raise the concentration of the polymeric drying oil to as much as 99% or greater non-volatile matter by still more extensive distillation or stripping; the use of a stripping gas, such as methane or a mixture of light hydrocarbons, is advantageous where highly concentrated drying oils are desired. Alternatively, one may use a low boiling naptha in the synthesis step, and thus simplify the eventual removal of the diluent from the polymeric product.

The product of the present invention is usually a solution of polymeric drying oil in a suitable hydrocarbon solvent such as solvent naptha or mineral spirits and is, depending on the amount and type of ether used, a clear, colorless to light yellow varnish composition, the polymer content of which has a viscosity of about 0.15 to 22 poises at 50% NVM and preferably 0.15 to 3.0 poises at 50% NVM.

*Example 1.*—To illustrate the effect of the catalyst activator on the length of the reaction and the type of addition, three runs were made which were identical except that the catalyst activator was changed. The respective reaction mixtures had the following composition.

| Run | A | B | C |
|---|---|---|---|
| Butadiene | 104 ml | 104 ml | 104 ml. |
| Dioxane-1,4 | 25.4 ml | 25.4 ml | 25.4 ml. |
| Na dispersion (in heptane) | 28 ml. (2.82 g. sodium) | | |
| Heptane | 384 ml | 384 ml | 384 ml. |
| Isopropyl alcohol (Wt. percent on sodium) | | 10.5 | |
| Hexamethyl phosphoramide (Wt. percent on sodium). | | | 17.7. |

Each mixture of reactants was placed in a one liter stainless steel bomb provided with a mechanical agitator. After closing, the reactors were heated to 50° C. and the reactors agitated and the conversion was followed with time. The following data were obtained.

| Time for 50% conversion, min. | Type of Addition | | |
|---|---|---|---|
| | 1.2 | Cis.-1,4 | Trans.-1,4 |
| Run A, 240 | | | |
| Run B, 138 | 70 | 11 | 19 |
| Run C, 26 | 87.5 | 0 | 12.5 |

It is evident from the above data that the use of hexamethyl phosphoramide reduces the reaction time to 50% conversion by about four fifths and increases the amount of 1,2 addition.

*Example 2.*—Additional experiments on the polymerization of butadiene-1,3, in the presence of hexamethyl phosphoramide, were carried out using the following recipes:

| Run | D | E | F | G | H |
|---|---|---|---|---|---|
| Heptane | 268 ml | 367 ml | 367 ml | 382 ml | 384 ml. |
| Dioxane | 25.4 ml | 25.4 ml | 25.4 ml | 25.4 ml | 25.4ml. |
| Sodium dispersion in heptane. | 28 ml. (2.82 g. sodium) | | | | |
| Butadiene | 197 ml | 103 ml | 103 ml | 97.5 ml | 105 ml. |
| Hexamethyl phosphoramide (wt. percent on sodium). | 636 | 636 | 318 | 106 | 35.4. |
| Initial Temp | 50° C | 50° C | 50° C | 50° C | 50° C. |
| Max. Temp | 110° C | 94° C | 83° C | 61° C | 65° C. |

The above data show that larger amounts of hexamethyl phosphoramide can be used. However, heat removal is difficult with amounts of hexamethyl phosphoramide larger than about 26 wt. percent based on sodium. Temperature runaways were experienced in each of the above runs.

The nature of the present invention having thus been set forth and specific advantages of the same given, what is claimed as new and useful and desired to be secured by Letters Patents is:

1. A polymerization process which comprises mixing 50 to 100 parts of a conjugated diene of 4 to 6 carbon atoms and 50 to 0 parts of a vinyl aromatic hydrocarbon, 50 to 500 parts of an inert hydrocarbon diluent boiling between —15 and +250° C., 1 to 100 parts of a co-diluent selected from the group consisting of open-chain ethers having 4 to carbon atoms and cyclic diethers having 4 to 8 carbon atoms and cyclic diethers having 4 to 8 carbon atoms wherein the two oxygen atoms are separated by at least two carbon atoms, 1 to 5 parts of finely divided alkali metal catalyst and 1 to 26 percent of hexamethyl phosphoramide based on the weight of alkali metal and maintaining the resulting mixture at 25 to 95° C. until substantially 100% conversion of monomers is reached.

2. A process which comprises mixing 100 parts of butadiene-1,3, 400 parts of an essentially aliphatic hydrocarbon solvent boiling between 150 and 200° C., 40 parts of dioxane, 4.4 parts of sodium metal and 0.78 parts of hexamethyl phosphoramide and maintaining the resultant reaction mixture at a temperature of 50° C. until 100% conversion of monomers is obtained.

References Cited by the Examiner

UNITED STATES PATENTS 3,213,155  10/1965  Schreisheim et al. __ 260—683.2
3,217,050  11/1965  Schriesheim et al. ___ 260—668

DELBERT E. GANTZ, *Primary Examiner.*

C. R. DAVIS, *Assistant Examiner.*